(12) United States Patent
Maillard et al.

(10) Patent No.: US 7,437,966 B2
(45) Date of Patent: Oct. 21, 2008

(54) INTERNAL CONTROL DEVICE FOR MECHANICAL GEARBOX

(75) Inventors: Jean Pierre Maillard, Septeuil (FR); Michel Raoul, Elancourt (FR)

(73) Assignee: Renault S.A.S., Boulogne Billancourt (FR)

( * ) Notice: Subject to any disclaimer, the term of this patent is extended or adjusted under 35 U.S.C. 154(b) by 278 days.

(21) Appl. No.: 10/543,154

(22) PCT Filed: Jan. 23, 2004

(86) PCT No.: PCT/FR2004/000157
§ 371 (c)(1),
(2), (4) Date: Apr. 6, 2006

(87) PCT Pub. No.: WO2004/068006
PCT Pub. Date: Aug. 12, 2004

(65) Prior Publication Data
US 2006/0201269 A1    Sep. 14, 2006

(30) Foreign Application Priority Data
Jan. 24, 2003    (FR)    ................... 03 00760

(51) Int. Cl.
*F16H 59/00*    (2006.01)
(52) U.S. Cl. ....................................... 74/335
(58) Field of Classification Search ............... 74/330, 74/331, 335, 340, 473.21, 473.36, 471 XY
See application file for complete search history.

(56) References Cited
U.S. PATENT DOCUMENTS

| 4,060,005 | A |  | 11/1977 | Bost |
| 4,307,624 | A |  | 12/1981 | Mylenek |
| 4,430,904 | A | * | 2/1984 | Fogelberg .................. 74/411.5 |
| 5,704,252 | A | * | 1/1998 | Loeffler .................... 74/473.25 |
| 6,321,612 | B1 | * | 11/2001 | Leimbach et al. ............. 74/335 |
| 6,389,919 | B1 | * | 5/2002 | Hennequet et al. ........ 74/473.37 |
| 6,755,089 | B2 | * | 6/2004 | Hirt ............................ 74/329 |
| 7,272,987 | B2 | * | 9/2007 | Hughes ....................... 74/340 |
| 2001/0025535 | A1 | * | 10/2001 | Kamiya ....................... 74/335 |
| 2003/0121343 | A1 | * | 7/2003 | Berger et al. .................. 74/340 |

FOREIGN PATENT DOCUMENTS

| DE | 100 11 272 |  | 8/2001 |
| DE | 101 33 695 |  | 3/2002 |
| DE | 10108881 | * | 9/2002 |
| FR | 2 802 600 |  | 6/2001 |
| FR | 2873376 | * | 2/2006 |

* cited by examiner

*Primary Examiner*—Roger Pang
(74) *Attorney, Agent, or Firm*—Oblon, Spivak, McClelland, Maier & Neustadt, P.C.

(57) ABSTRACT

An internal control device for a mechanical gearbox including first and second input clutches which, respectively, control transmission from engine torque towards first and second primary concentric shafts bearing; stationary pinions; two output shafts supporting idle pinions which are driven respectively by the first and second input shafts; and a mechanism for jaw clutching the idle pinions, which are actuated by an assembly of shift forks. All of the gearbox ratios are selected and switched by a common selector including a selector cylinder and a switching carriage which is concentric to the cylinder and which is disposed therein.

15 Claims, 8 Drawing Sheets

INTERNAL CONTROL DEVICE FOR MECHANICAL GEARBOX

The present invention relates to the internal control of mechanical gearboxes.

More precisely, this invention relates to an internal control device for a mechanical gearbox equipped with first and second input clutches that respectively control the transmission of the engine torque to concentric first and second primary shafts carrying fixed pinions, with two secondary shafts carrying idler pinions driven by the first and second primary shafts, and with claw-coupling means of the idler pinions actuated by an assembly of forks.

It is preferably used in an automatic or robotic gearbox, or in other words one in which the assembly of actuators, clutch control and selection and engagement of gear ratios is placed under the control of a calculator that takes charge of all or part of the control decisions in place of the operator.

Certain motor-vehicle gearboxes have two parallel torque-flow paths having gear-reduction stages that can be inserted in or separated from the said torque flow, and between which torque transmission can be achieved continuously.

There are known examples of transmissions referred to as "two-clutch transmissions", in which two parallel transmission paths can be coupled independently to the engine by two respective clutches. French patent 2802600 describes an example of such a gearbox.

To ensure continuity of the torque flow in this type of transmission, it is necessary that the two portions of the transmission, grouping respectively the odd-numbered gear-reduction stages and the even-numbered gear-reduction stages, can be switched simultaneously. If, for example, the gear-reduction stage of the first gear ratio is inserted in a first torque-transmission path of the first partial transmission, whose input clutch is closed, and if the gear-reduction stage of the second gear ratio is inserted in a second transmission path, whose input clutch is open, the two clutches are then actuated simultaneously to effect switching from the first gear ratio to the second gear ratio, in such a way that the initially open clutch is closed, and vice versa.

Nevertheless, to achieve switching operations with continuous torque transmission, it is indispensable to be able to achieve, independently for each "transmission path", the insertion or separation of a gear-reduction stage and the actuation of the clutch. For this reason, each of the transmission paths is provided with a particular actuator for the selection and engagement of gear ratios and with another actuator dedicated to the clutch.

The disadvantage of such an arrangement is the presence of two actuators to switch the gear-reduction stages in the two paths of the transmission, and of two other actuators for switching the clutches. The corresponding transmission is therefore heavily penalized by reason of its large space requirement and of its high manufacturing costs.

The invention aims to limit these disadvantages by proposing a gearbox control device in which actuation of the switching of the two transmission paths is achieved by the same actuator, actuation of the clutches also able to be assured by two other independent actuators.

With this objective, it proposes that the selection of and shifting between all ratios of the gearbox are assured by a common selector composed of a selection drum and of a shift carriage concentric with the drum and disposed in the interior thereof.

According to a preferred embodiment of the invention, the drum is fixed axially but is mobile in rotation, in such a way that it drives the carriage in rotation.

Figure 1:
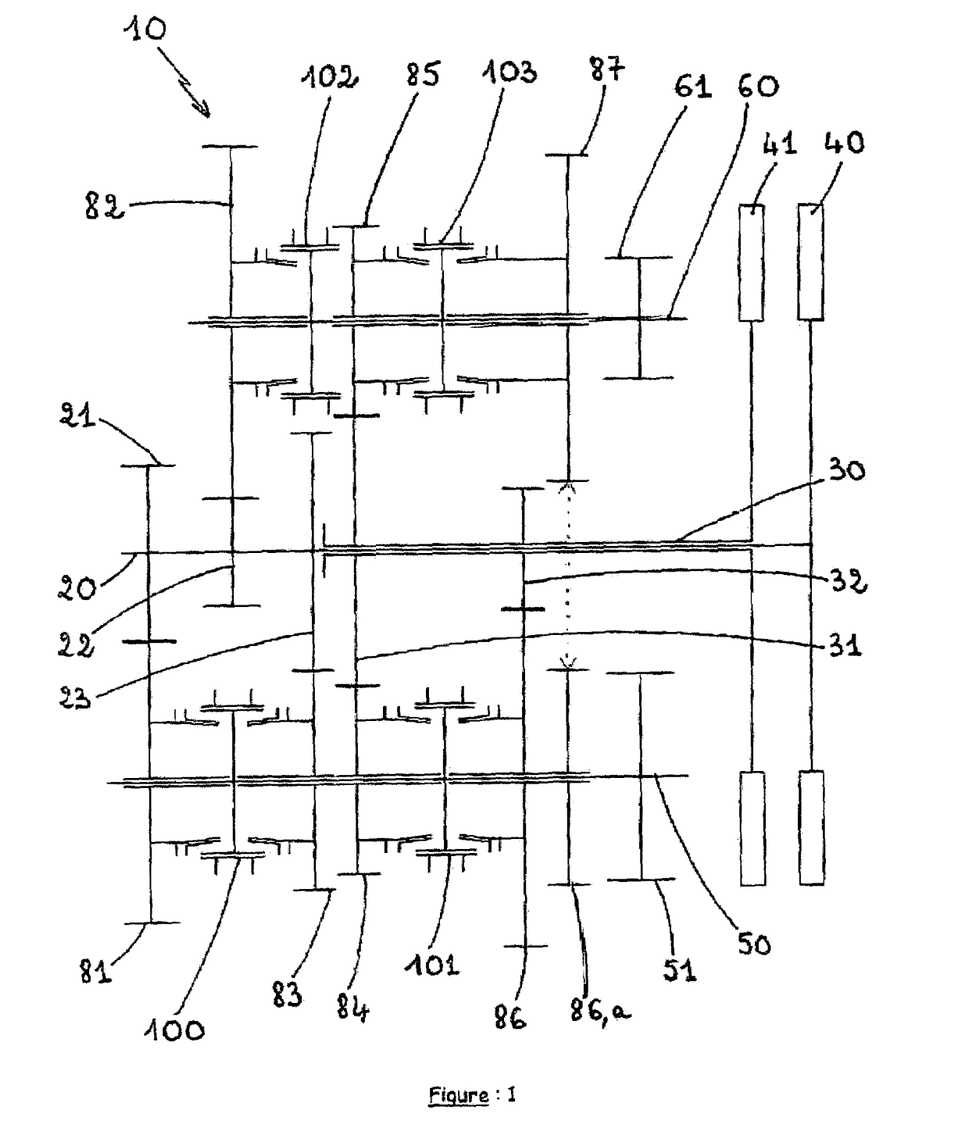
FIG. 1 schematically represents a gearbox 10 with double input clutches, in which gearbox the control device of the invention has non-limitative application.

Other characteristics and advantages of the present invention will become clearly apparent upon reading the detailed description hereinafter with reference to the attached drawings, wherein:

FIG. 1 illustrates a schematic structure of a gearbox 10 with double input clutch of known type, capable of being controlled according to the invention.

In conventional manner, gearbox 10 is provided with a solid first primary shaft 20 that is mounted coaxially with a hollow second primary shaft 30. These two shafts are mounted to rotate in a case (not illustrated) and are driven by an engine, via respectively a first clutch 40 and a second clutch 41, which, for example, are but do not necessarily have to be dry single-disk clutches.

Gearbox 10 is also provided with a first secondary shaft 50 and a second secondary shaft 60, also mounted to rotate in the case. These secondary shafts are disposed at the ends of the branches of a "V", contained in the plane transverse to the axes of shafts 20, 30, 50 and 60, and the vertex of which coincides with the axis of primary shafts 20 and 30.

Gear trains are disposed between primary shafts 20 and 30 and between secondary shafts 50 and 60, in such a way that they transmit the vehicle torque to a ring gear of a differential of a bridge (not illustrated) driving the wheels of a vehicle. For this purpose, first secondary shaft 50 and second secondary shaft 60 are respectively provided with a first driving pinion 51 and a second driving pinion 61, both of which are engaged with the ring gear of the differential (not illustrated).

The gear trains are composed of fixed pinions carried by first and second primary shafts 20 and 30 and which engage with idler pinions carried by first and second secondary shafts 50 and 60. The idler pinions can be selectively linked in rotation with first and second secondary shafts 50 and 60 by independent claw-coupling means, to achieve independent gear trains corresponding selectively to at least two forward gear ratios and to one reverse gear ratio. The two clutches, 40 of first primary shaft 20 and 41 of second primary shaft 30, can also be actuated alternatively by shifting through a state in which they both transmit the torque by sliding of one of them, to permit at least one change of gear ratio without discontinuity of the torque transmitted to the wheels.

First primary shaft 20 carries three fixed pinions, 21, 22 and 23 from left to right, the first being engaged with a single idler pinion 81 carried by first secondary shaft 50, to constitute the third gear ratio, the second also being engaged with a single idler pinion 82 carried by second secondary shaft 60 to constitute the first gear ratio. Finally, the third is engaged with a single idler pinion 83 carried by first secondary shaft 50 to constitute the fifth gear ratio. Hollow second primary shaft 30 carries two fixed pinions, 31 and 32 from left to right. The first is engaged with two idler pinions 84 and 85, respectively carried by first secondary shaft 50, to constitute the sixth gear ratio, and by second secondary shaft 60 to constitute the fourth gear ratio, the second being engaged with a single idler pinion 86 carried by first secondary shaft 50 to constitute the second gear ratio. The reverse gear ratio has its own idler pinion 87, carried by second secondary shaft 60, which engages with idler pinion 86a linked to idler pinion 86—which acts as an intermediate pinion for reversing—of the second gear ratio.

The set of six forward gear ratios and the reverse gear ratio are therefore obtained with three fixed pinions 21, 22 and 23 on solid first primary shaft 20 to obtain the odd-numbered gear ratios and with two fixed pinions 31 and 32 on hollow second primary shaft 30 to obtain the even-numbered gear ratios.

In addition, all the idler pinions can be selectively linked to the secondary shafts carrying them by simple or double claw-coupling devices. Idler pinions 81, 83, 84 and 86 can therefore be selectively linked to secondary shaft 50 carrying them, and idler pinions 82, 85 and 87 can be selectively linked to secondary shaft 60 carrying them.

A first double claw-coupling device 100 makes it possible selectively to link idler pinion 81 in rotation to secondary shaft 50 to obtain the third gear ratio or to so link idler pinion 83 to obtain the fifth gear ratio. A second double claw-coupling device 101 makes it possible to link idler pinions 84 and 86 in rotation to secondary shaft 50 to obtain the sixth and second gear ratios. A third single claw-coupling device 102 makes it possible selectively to link idler pinion 82 in rotation to secondary shaft 60 to obtain the first gear ratio. Finally, a double claw-coupling device 103 makes it possible selectively to link idler pinion 87 in rotation to secondary shaft 60 to obtain the fourth gear ratio, or to so link idler pinion 87 to obtain the reverse gear ratio.

Figure 2:
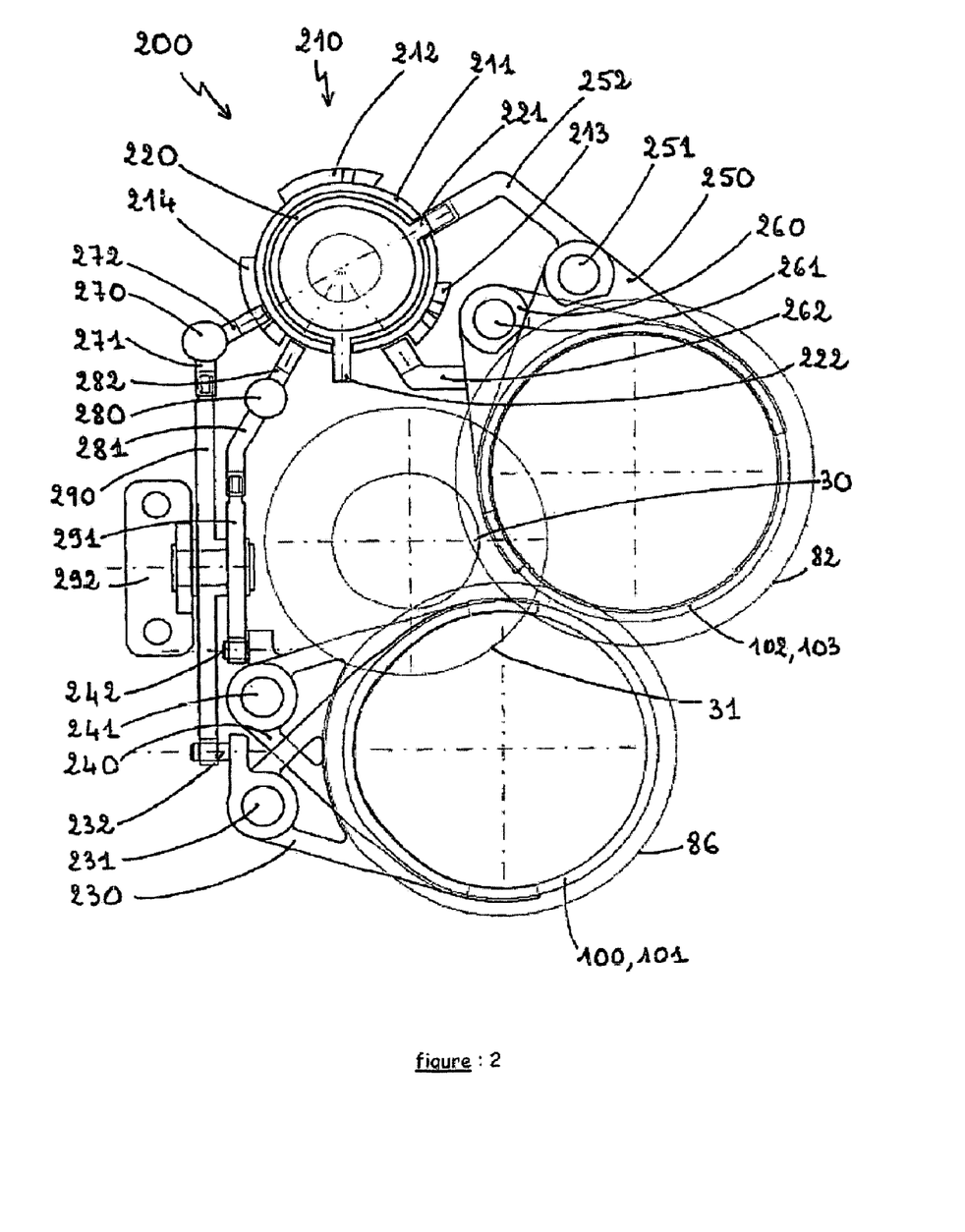
FIG. 2 represents the entirety of the proposed internal control device in position of selecting the first gear ratio.

FIG. 2 represents the overall structure of internal control device 200 constructed according to the invention.

This device, provided with a single selector 210, whose axis of rotation is parallel to the axes of primary shafts 20, 30 and of secondary shafts 50, 60, can turn relative to its axis. It is composed of a cylindrical selection drum 211, fixed axially relative to this same axis, carrying three peripheral sectors 212, 213 and 214 of larger diameter, and of a shift carriage 220, also of cylindrical shape, concentric with drum 211 and placed in the interior thereof, driven in rotation by the drum via fingers 221 and 222, and being capable of being displaced axially. Depending on its angular position, drum 211 places or does not place fingers 221 and 222 opposite the claws of the fork axes with which they cooperate.

The device provided for control of the claw-coupling groups has a first control fork 230 of claw-coupling group 100 of the third and fifth gear ratios, carried by a rod 231 sliding relative to its bearings in the case (not illustrated), having a drive pin 232, a second control fork 240 of claw-coupling group 101 of the sixth and second gear ratios, carried by a rod 241 having a drive pin 242, a third control fork 250 of claw-coupling group 102 of the first gear ratio, carried by a rod 251 having a drive claw 252, and a fourth control fork 260 of claw-coupling group 103 of the fourth and reverse gear ratios, carried by a rod 261 having a drive claw 262.

Two rockers 290 and 291 carried by a single support 292 transfer the axial movements of relay rods 270 and 280 to forks 230 and 240 situated in the lower portion of the box. Rod 270 carries two claws 271 and 272, which cooperate respectively with rocker 290 and finger 222 of carriage 220 for engaging the gear ratios. Rod 280 also carries two claws 281 and 282, which cooperate respectively with rocker 291 and finger 222.

The positioning of the control-fork rods of the clutches and the shifting of the fork branches are determined by the pinions or the bulkiest turning elements on each of the shafts. Rods 231, 241 are placed as a function of the space requirement of pinion 86 of the second gear ratio on secondary shaft 50 and of fixed pinion 31 of the third and fifth gear ratios on hollow primary shaft 30. Rods 251, 261 are disposed as a function of the space requirement of pinion 82 of the first gear ratio on secondary shaft 60 and as a function of fixed pinion 31 of the third and fifth gear ratios on hollow primary shaft 30. Finally the branches are disposed as a function of the space requirement of hollow shaft 30.

Figure 3:
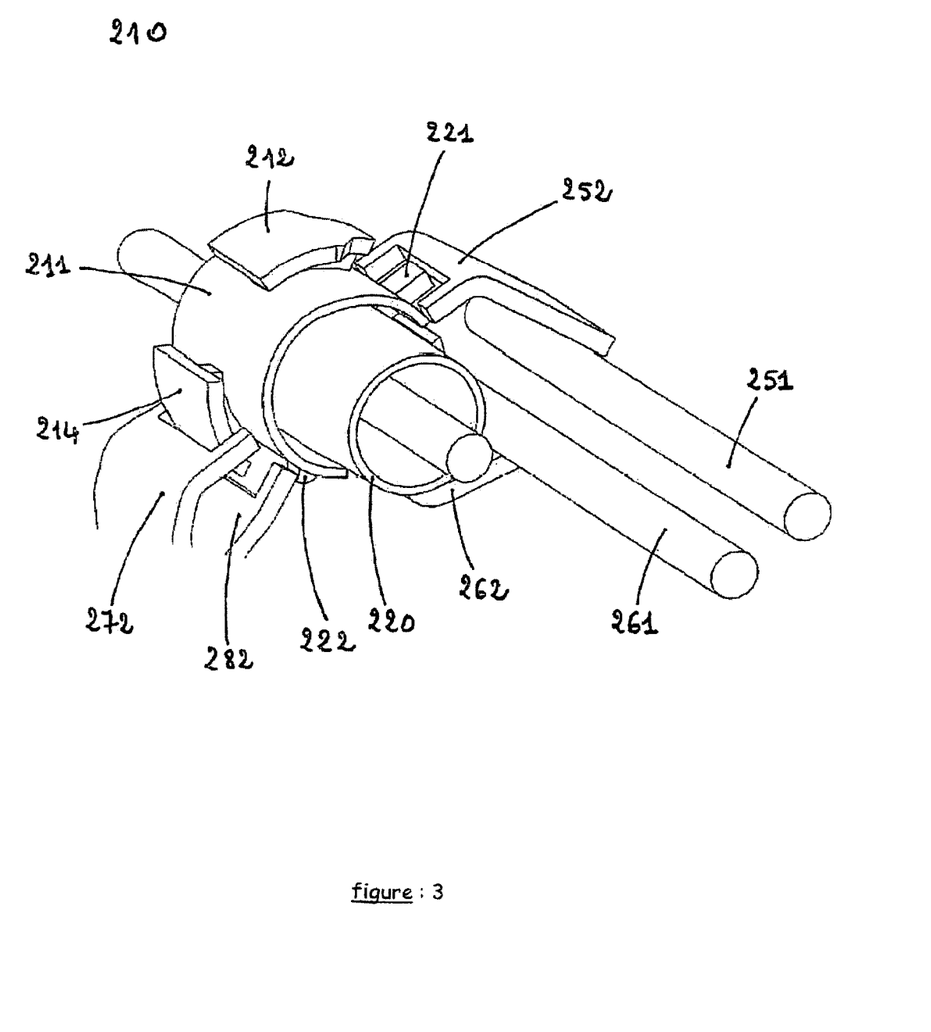
FIG. 3 is a perspective view representing the selector and the angularly distributed claws.

On FIG. 3, which is a perspective diagram of the selector, there are seen drum 211, carriage 220, two fork rods 251, 251 and drive claws 252, 262, 272, 282 of the fork rods surrounding the drum.

Figure 4:
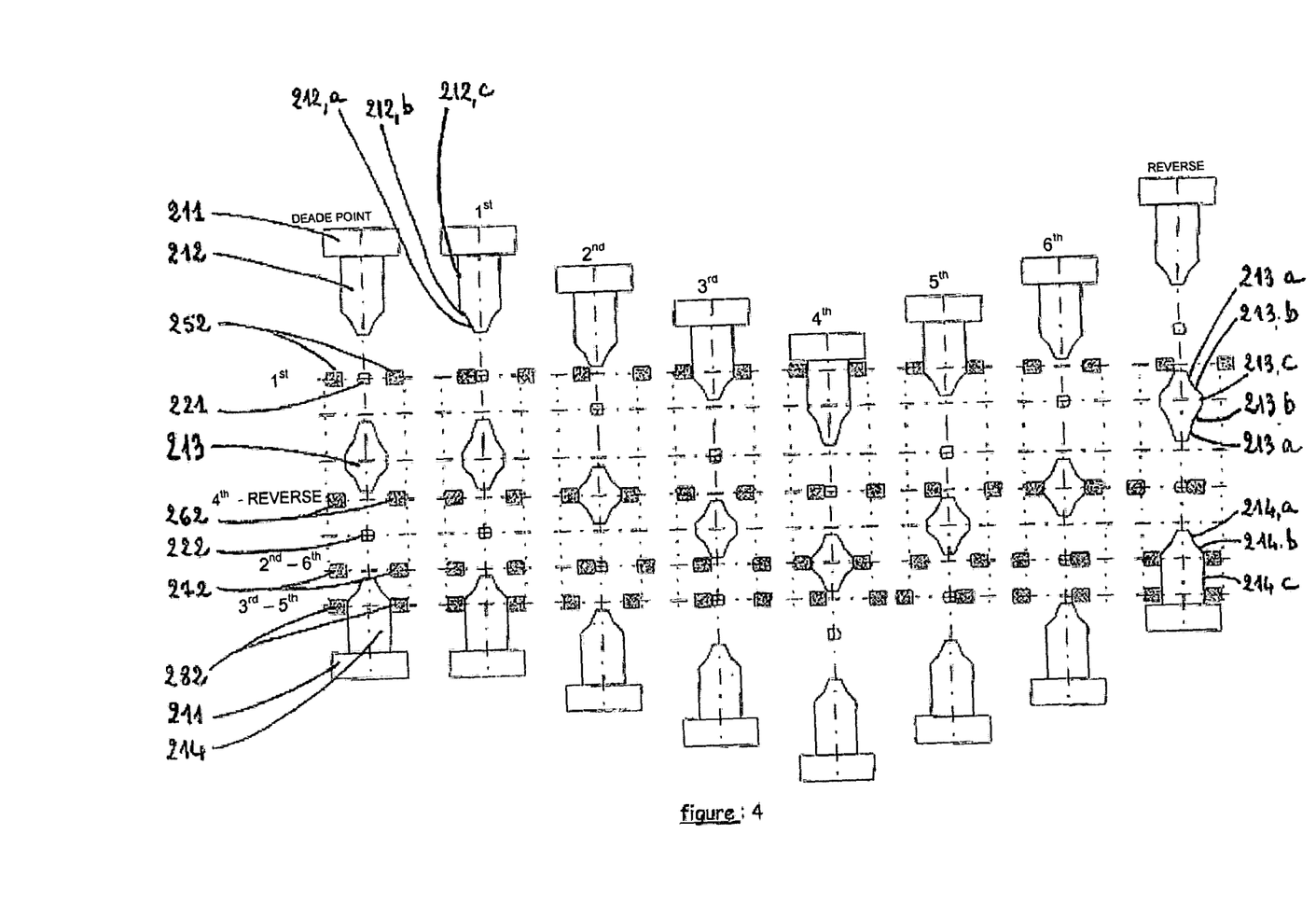
FIG. 4 shows in part the fingers, the peripheral zones of the selector and the claws of the forks in flattened-out representation.

FIG. 4 shows in part the fingers, the peripheral zones of the selector and the fork claws in a flattened-out diagram in the different situations of dead point or neutral and of the six forward and one reverse gear ratio. On this figure there can be seen drum 211 and its three peripheral sectors 212, 213 and 214, fingers 221 and 222 fixed to rotate and translate with the carriage (not illustrated), as well as the respective actuating claws 252, 262, 272, 282 of the forks of the first gear ratio, of the fourth and reverse gear ratios, of the second and sixth gear ratios and of the third and fifth gear ratios.

In this flattened-out diagram, drum 211 performs only translational displacements, corresponding to its real rotational displacement. It is seen that it effects disengagement and locking of the gear ratio of the same parity as that selected for engagement, and it permits a gear ratio of different parity to be maintained in engaged position.

Peripheral sector 212 has a first zone 212a, with flanks that are slightly inclined relative to the axis of symmetry of sector 212, a second zone 212b with more strongly inclined flanks, and a third zone 212c with parallel flanks oriented transversely relative to the axis of rotation of the drum.

During translation of the drum from its position with second gear ratio selected to third gear ratio selected, peripheral sector 212 cooperates with engaging claw 252 of the first gear ratio. Zone 212a initiates return of claw 252 from its engaged gear position, zone 212b achieves return of claw 252 to its neutral position and, finally, zone 212c locks the claw in its dead-point position.

At each of its two ends, central peripheral sector 213 has a first zone 213a, with flanks that are slightly inclined relative to the axis of symmetry of sector 213, followed by a second zone 213b with more strongly inclined flanks and a zone 213c with flanks that are parallel and in the central portion. During translation of the drum from its position with third gear ratio selected to fourth gear ratio selected, zones 213a and 213b cooperate with claw 272 of the second and sixth gear ratios and ensure that the second gear ratio is disengaged then locked at the dead point. During displacement of the drum from its position with fifth gear ratio selected to sixth gear ratio selected, zones 213a and 213b cooperate with claw 262 of the fourth and reverse gear ratios and cause the fourth gear ratio to become disengaged and then the fourth and reverse gear ratios to become locked at the dead point.

Finally, during translation of the drum from its position with first gear ratio selected to second gear ratio selected, in the case that the reverse gear ratio is engaged, zones 213a and 213b cooperate with claw 262 of the fourth and reverse gear ratios and cause the reverse gear ratio to become disengaged and then the fourth and reverse gear ratios to become locked at the dead point.

Just as sector 212, peripheral sector 214 has a first zone 214a, with flanks that are slightly inclined relative to its axis of symmetry, a second zone 214b with more strongly inclined flanks, and a third zone 214c with parallel flanks oriented transversely relative to the axis of rotation of the drum.

In the case in which the third or fifth gear ratio is engaged, peripheral sector 214 cooperates with claw 282 during the translation of the drum from its position with second gear ratio selected to first gear ratio selected. Zone 214a initiates return of claw 282 from its position with the gear ratio engaged, zone 214b achieves return of claw 282 to its neutral position and, finally, zone 214c locks the third and fifth gear ratios at the dead point.

In the case in which the second or sixth gear ratio is engaged, peripheral sector 214 cooperates with claw 272 during the translation of the drum from its position with first gear ratio selected to reverse gear ratio selected. Zone 214a initiates return of claw 272 from its position with the gear ratio engaged, and zone 214b achieves return of claw 272 to its neutral position. Finally, zone 214c locks the second, sixth, third and fifth gear ratios at the dead point.

By analogy, in all situations of consecutive upshifts or downshifts or shifts across multiple gear ratios, the condition of prevention of engagement is always respected. In effect, the drum fulfills its function of disengaging gear ratios of the same parity and locking them at the dead point.

According to another version not illustrated by the figures, peripheral sectors 212, 213, 214 may exhibit only two distinct angular zones. The peripheral sectors on the selection drum, or in other words a first angular zone with non-parallel flanks, which have a progressive inclination relative to the axis of rotation of the drum and cooperate with claws to initiate and achieve axial displacement thereof from a position with gear ratio engaged to a neutral position known as the dead point, and an angular zone with parallel flanks that cooperate with the claws to lock the axes of the forks for engaging the gear ratios in dead-point position.

Referring to FIG. 4, it is seen that the distance between the two faces of each of claws 252, 262, 272, 282 is clearly larger than the thickness of fingers 221, 222. By virtue of this arrangement, each finger can be in neutral position or position with gear ratio engaged, both when the claw into which it is introduced is effectively in position with gear ratio engaged and when this claw is not engaging any gear ratio.

In this way fingers 221, 222 can return to neutral position without disengaging gear ratios. During a selection displacement transverse with respect to the claws, they can become engaged in any one of the claws with which they must cooperate, regardless of whether the claw position is neutral or gear engaged.

As an example, it is seen in FIG. 4 that finger 222 is in neutral position in claw 272 of the sixth and second gear ratios, which claw is in position with sixth gear engaged, and that it has the possibility of being displaced, since in the fifth gear ratio it is in neutral position in claw 282 of the third and fifth gear ratios, which claw itself is in position with the fifth gear engaged.

Figure 5:
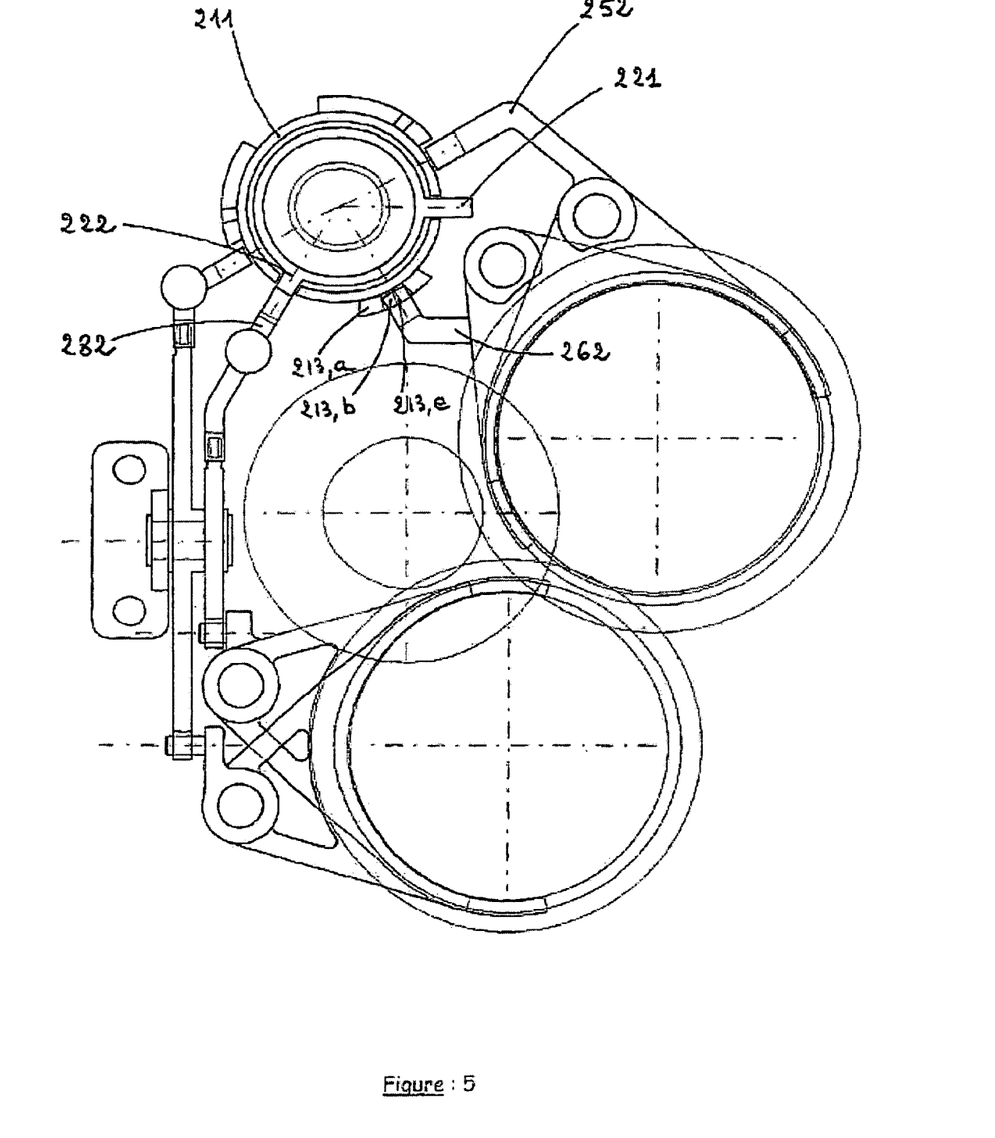
FIG. 5 represents the entirety of the proposed internal control device in position of selecting the second and sixth gear ratios.
Figure 6:
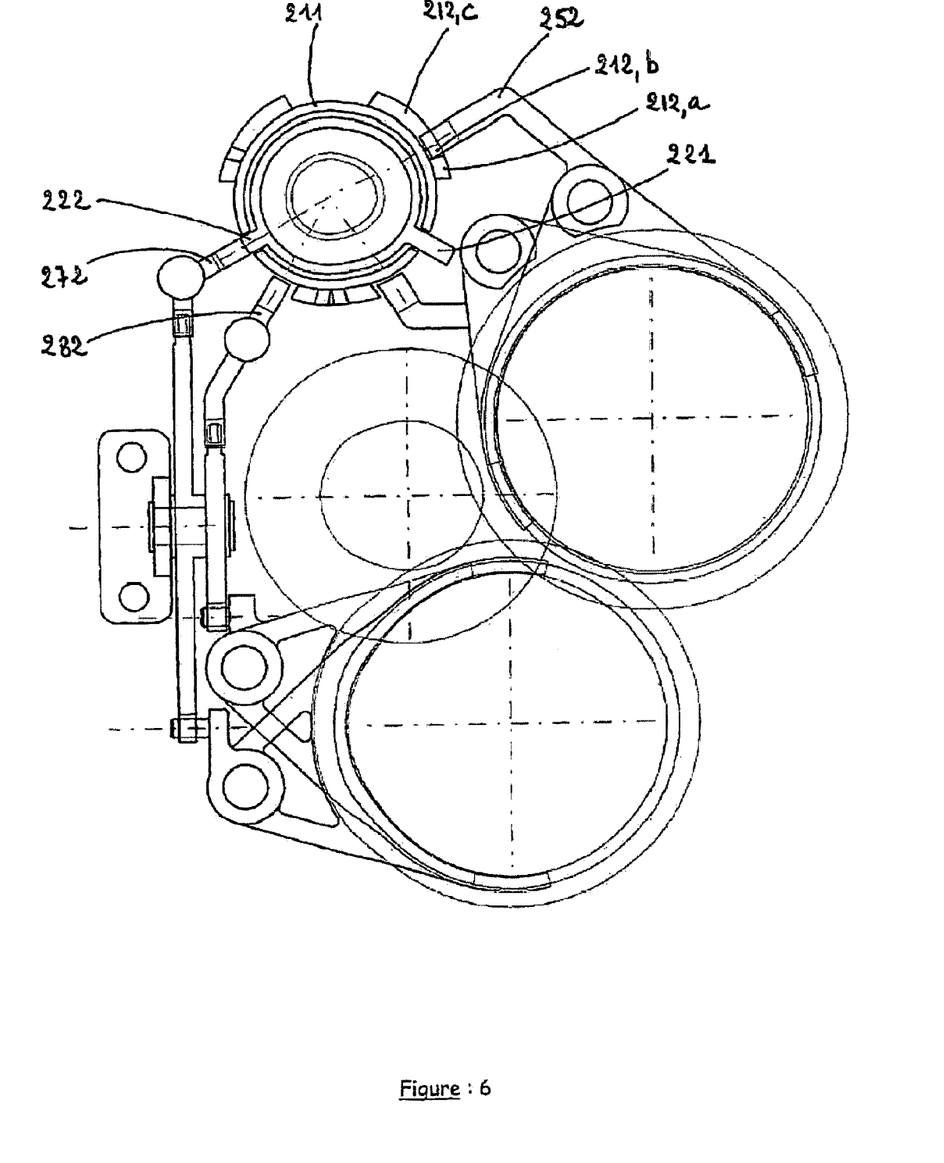
FIG. 6 represents the entirety of the proposed internal control device in position of selecting the third and fifth gear ratios.
Figure 7:
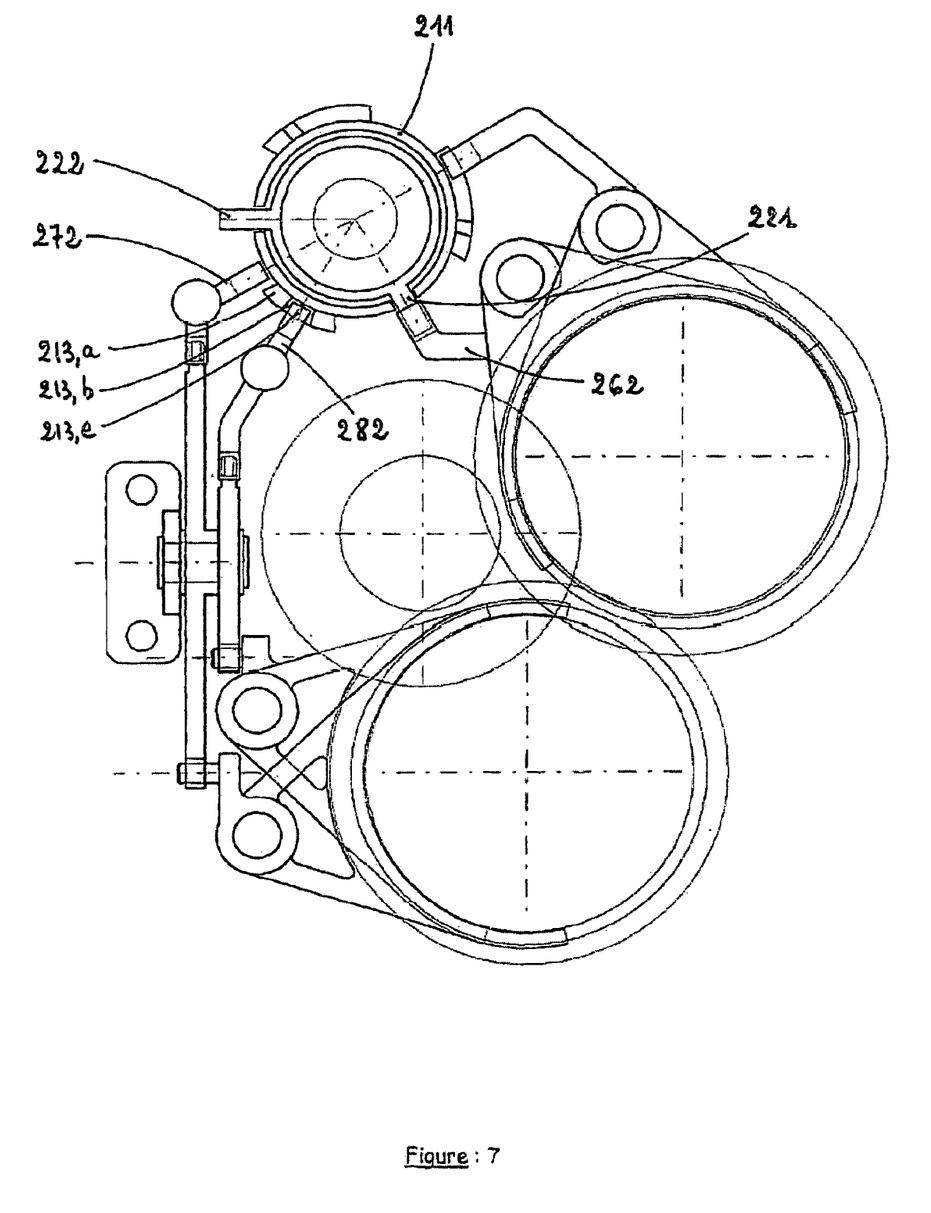
FIG. 7 represents the entirety of the proposed internal control device in position of selecting the fourth gear ratio.
Figure 8:
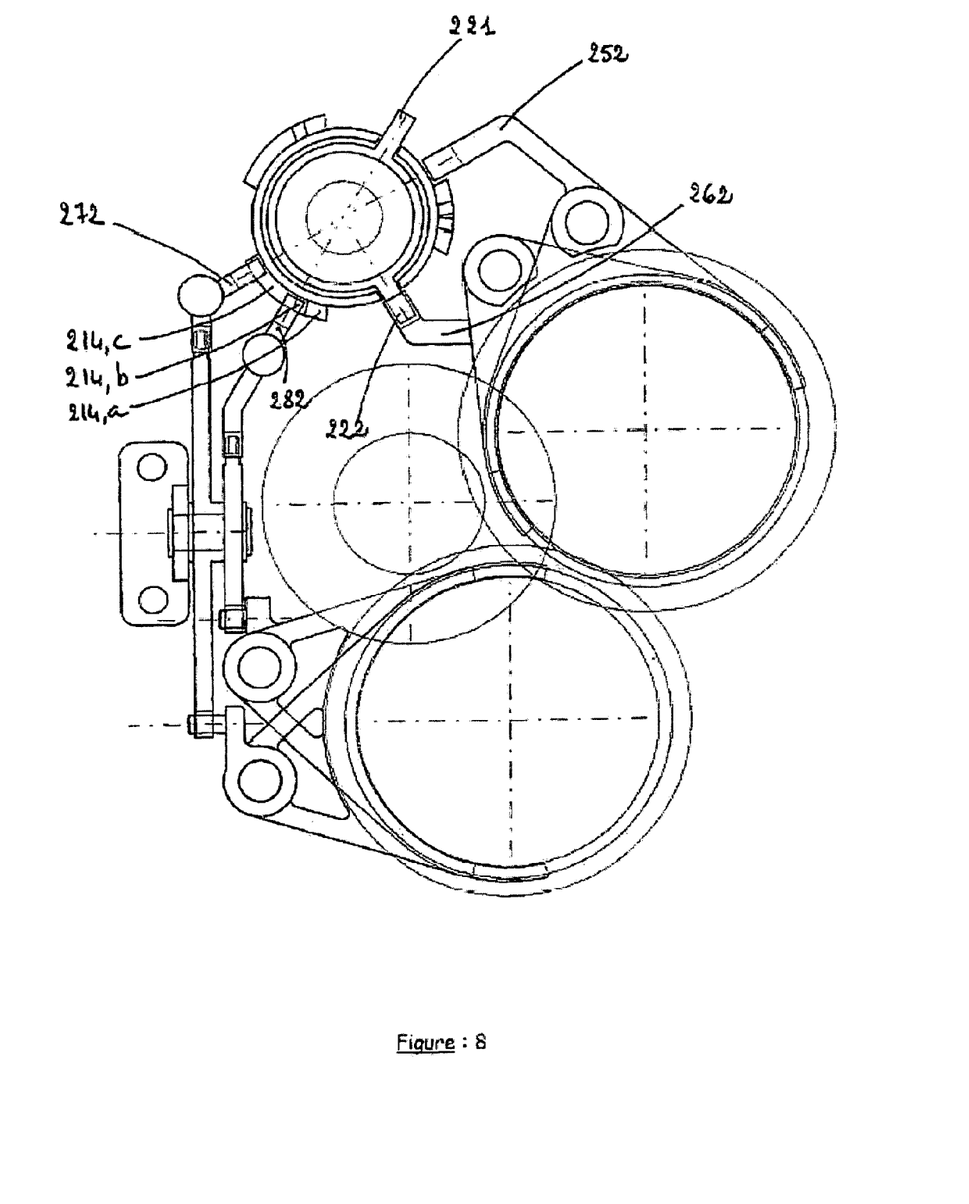
FIG. 8 represents the entirety of the proposed internal control device in position of selecting the reverse gear ratio.

FIGS. 5 to 8 represent the entirety of the proposed internal control device in the different selection positions. Thus FIG. 5 represents the entirety of the proposed internal control device in position of selecting the second and sixth gear ratios. FIG. 6 represents the entirety of the proposed internal control device in position of selecting the third and fifth gear ratios. FIG. 7 represents the entirety of the proposed internal control device in position of selecting the fourth gear ratio. FIG. 8 represents the entirety of the proposed internal control device in position of selecting the reverse gear ratio.

According to the invention, these figures show that the selections of lines are obtained by rotations of the drum by an angle of constant value and that the selection of two consecutive gear ratios is always achieved for this angle of rotation.

By comparing FIGS. 2 and 5, it is seen that, by a first angular rotation in clockwise direction, finger 221, which is initially in neutral position facing claw 252 of the first gear ratio (FIG. 2) in speed-engaged position, reaches the zone between the claws of the first and fourth gear ratios. Simultaneously, central peripheral sector 213 of drum 211 disengages the reverse gear ratio if necessary by the action of inclined flanks 213a and 213b on fork claw 262 of the fourth and reverse gear ratios. Parallel flanks 213c lock the claw, and finger 222 leaves the zone between the claws of the fourth and second gear ratios and becomes oriented facing claw 282 of the second gear ratio. By an axial displacement, it then drives the claw, engages the second gear ratio and returns to neutral position. Both the first and second gear ratios are engaged, and the simultaneous actuation of the two clutches makes it possible to obtain a shift from the first to the second gear ratio under torque.

Referring to FIGS. 5 and 6, it is seen that, by a second angular rotation of the same value and in the same direction, finger 221 remains in the zone between the claws of the first and fourth gear ratios. Simultaneously, first peripheral sector 212 of drum 211 disengages the first gear ratio by the action of inclined flanks 212a and 212b on fork claw 252 of the first gear ratio. Parallel flanks 212c lock the claw. Finger 222 leaves claw 282 of the second gear ratio, becomes oriented facing claw 272 of the third gear ratio, engages the third gear ratio and returns to neutral position. Both the second and third gear ratios are engaged. The simultaneous actuation of the two clutches therefore makes it possible to obtain a shift from the second to the third gear ratio under torque.

By comparing FIGS. 6 and 7, it is seen that, by a third angular rotation of the same value and in the same direction, finger 221 leaves the zone between the claws of the first and fourth gear ratios and becomes oriented facing claw 262 of the fourth and reverse gear ratios. Simultaneously, central peripheral sector 213 of drum 211 disengages the second gear ratio by the action of inclined flanks 213a and 213b on fork claw 282 of the second and sixth gear ratios. Parallel flanks 213c lock the claw, finger 222 leaves claw 272 of the third and fifth gear ratios, and becomes oriented in an inactive angular position. Finger 221 engages the fourth gear ratio and returns to neutral position. Both the third and fourth gear ratios are engaged and are the only ones engaged, and the simultaneous actuation of the two clutches therefore makes it possible to obtain a shift from the third to the fourth gear ratio under torque.

From the position of FIG. 7, if a first angular rotation of the same value in counterclockwise direction is undertaken, the fifth gear ratio is engaged and, by a second angular rotation of the same value in counterclockwise direction, a shift to the sixth gear ratio is achieved.

Finally, by comparing FIGS. 2 and 8, it is seen that, by an angular rotation of the same value in the counterclockwise direction, finger 221, initially in neutral position facing claw 252 of the first gear ratio in neutral or engaged position, becomes oriented in an inactive angular zone. Simultaneously, central peripheral sector 214 of drum 211 disengages the second gear ratio if necessary by the action of inclined flanks 214a and 214b on fork claw 282 of the second and sixth gear ratios. Parallel flanks 214 lock claws 272 and 282, finger 222 leaves the zone between the claws of the second and reverse gear ratios, and becomes oriented facing claw 262 of the reverse gear ratio. By an axial displacement, it drives the claw, engages the reverse gear ratio and returns to neutral position. In a first case, only the reverse gear ratio is engaged. In a second case, both the reverse and first gear ratios are engaged, and the simultaneous actuation of the two clutches allows us to obtain a dynamic alternate shift from the reverse to the first gear ratio and vice versa.

By virtue of the invention, engagement of the gear ratios can be obtained in the following manner.

By a first angular rotation in clockwise direction, first finger 221, initially in neutral position facing claw 252 of the first gear ratio in speed-engaged position, reaches the zone between the claws of the first and fourth gear ratios, while simultaneously, second finger 222 leaves the zone between the claws of the fourth and second gear ratios and becomes oriented facing claw 272 of the second gear ratio. By an axial displacement, it drives this claw, engages the second gear ratio and returns to neutral position. Both the first and second gear ratios are engaged, and the simultaneous actuation of the two clutches makes it possible to obtain a shift from the first to the second gear ratio under torque.

By a second angular rotation in the same direction, first finger 221 remains in the zone between the claws of the first and fourth gear ratios. Simultaneously, first peripheral sector 212 of the drum, by the action of the inclined flanks on fork claw 252 of the first gear ratio, disengages the first gear ratio, and second finger 222 leaves claw 272 of the second gear ratio, becomes oriented facing claw 282 of the third gear ratio, engages the third gear ratio and returns to neutral position. Both the second and third gear ratios are engaged, and the simultaneous actuation of the two clutches makes it possible to obtain a shift from the second to the third gear ratio under torque.

By a third angular rotation in the same direction, finger 221 leaves the zone between the claws of the first and fourth gear ratios and becomes oriented facing claw 262 of the fourth and reverse gear ratios. Simultaneously, central peripheral sector 213 of the drum disengages the second gear ratio by the action of the inclined flanks on fork claw 272 of the second and sixth gear ratios. The second finger leaves the claw of the third and fifth gear ratios, and becomes oriented in an inactive angular position. First finger 221 engages the fourth gear ratio and returns to neutral position. Both the third and fourth gear ratios are engaged and are the only ones engaged, and the simultaneous actuation of the two clutches makes it possible to obtain a shift from the third to the fourth gear ratio under torque.

From this position, second finger 222 returns from its inactive angular position facing claw 282 of the third and fifth gear ratios by effecting a first angular rotation in counterclockwise direction. First finger 221 becomes oriented in the zone between the claws of the first and fourth gear ratios. The axial displacement of second finger 222 disengages the third gear ratio and engages the fifth gear ratio. Both the fourth and fifth gear ratios are engaged and are the only ones engaged, and the simultaneous actuation of the two clutches therefore makes it possible to obtain a shift from the fourth to the fifth gear ratio under torque.

By a second angular rotation in counterclockwise direction, second finger 222 leaves its angular position facing claw 282 of the third and fifth gear ratios and becomes angularly positioned facing claw 272 of the sixth gear ratio. Simultaneously, central peripheral sector 213 of the drum disengages the fourth gear ratio by the action of the inclined flanks on the fork claw of the fourth and reverse gear ratios, and the first finger is still oriented in the zone between the claws of the first and fourth gear ratios. The axial displacement of second finger 222 engages the sixth gear ratio. Both the fifth and sixth gear ratios are engaged and are the only ones engaged. The simultaneous actuation of the two clutches therefore makes it possible to obtain a shift from the fifth to the sixth gear ratio under torque.

Finally, by an angular rotation in counterclockwise direction, first finger 221, initially in neutral position facing claw 252 of the first gear ratio in neutral or engaged position, becomes oriented in an inactive angular zone. Simultaneously, second finger 222 leaves the zone between the claws of the second and reverse gear ratios, then, by an axial displacement, it drives this claw, engages the reverse gear ratio and returns to neutral position. Peripheral sector 214 of drum 211 locks fork claws 272, 282 of the second, sixth and third, fifth gear ratios. In a first case, only the reverse gear ratio is engaged, in a second case, both the reverse and first gear ratios are engaged. The simultaneous actuation of the two clutches therefore makes it possible to obtain a dynamic alternate shift from the reverse to the first gear ratio and vice versa.

By analogy, the invention makes it possible to effect all the downshifts from the sixth gear ratio to the first gear ratio as well as shifts across multiple gear ratios under torque or with disconnection of torque.

The invention claimed is:

1. An internal control device for a mechanical gearbox comprising:

first and second input clutches that respectively control transmission of engine torque to concentric first and second primary shafts carrying fixed pinions, with two secondary shafts carrying idler pinions driven respectively by the first and second primary shafts, and with claw-coupling means of the idler pinions actuated by an assembly of forks, wherein a common selector, composed of a selection drum and a shift carriage concentric with the selection drum and disposed in the interior thereof, is configured to assure selection of and shifting between multiple gear ratios of the mechanical gearbox, wherein said selection drum is fixed axially, wherein said shift carriage is axially movable, and wherein said common selector is configured to assure selection of and shifting between all gear ratios of the mechanical gearbox.

2. A control device according to claim 1, wherein said shift carriage and said selection drum are cylindrical.

3. A control device according to claim 1, wherein said shift carriage is configured to be driven in rotation by said selection drum.

4. A control device for a mechanical gearbox comprising:

first and second input clutches that respectively control transmission of engine torque to concentric first and second primary shafts carrying fixed pinions, with two secondary shafts carrying idler pinions driven respectively by the first and second primary shafts, and with claw-coupling means of the idler pinions actuated by an assembly of forks, wherein a common selector, composed of a selection drum and a shift carriage concentric with the selection drum and disposed in the interior thereof is configured to assure selection of and shifting between all gear ratios of the mechanical gearbox, wherein the selection drum is fixed axially but is mobile in rotation.

5. A control device according to claim 4, wherein the selection drum drives the carriage in rotation.

6. A control device according to claim 4, wherein the carriage includes fingers that displace rods of the forks to engage the gear ratios.

7. A control device according to claim 4, wherein the selection drum includes at least three peripheral sectors of larger diameter cooperating with drive claws of rods of the forks.

8. A control device according to claim 7, wherein the three peripheral sectors of the selection drum include three zones of different angular inclinations relative to the axis of rotation of the drum, cooperating with the drive claws respectively to initiate an axial displacement thereof from a position with gear ratios engaged to a neutral position, to achieve the axial displacement and to lock the fork rods in a neutral position.

9. An internal control device according to claim 7, the peripheral sectors of the selection drum have at their ends a first angular zone with non-parallel flanks of progressive slope, which cooperate with the drive claws to initiate an axial displacement thereof from a position with gear ratios engaged to a neutral position as a dead point, and an angular zone with parallel flanks, which cooperate with the drive claws to lock the fork rods that engage the gear ratios in position.

10. A control device according to claim 8, wherein the angular zones of the peripheral sectors are oriented transversely relative to the axis of rotation of the selection drum.

11. A control device according to claim 10, further comprising a central peripheral sector that cooperates with drive claws.

12. A control device according to claim 11, wherein the central peripheral sector includes zones with inclined flanks at its two ends, whereas other sectors have zones with inclined flanks only at their end facing the central sector.

13. A control device according to claim 4, wherein engagement and disengagement of all gear ratios is effected by simple rotation of a rotation of the selection drum.

14. A control device according to claim 4, wherein the selection drum permits simultaneous engagement of two gear ratios of different parity.

15. A control device according to claim 4, wherein the selection drum disengages a gear ratio of a same parity as that in a course of selection.

* * * * *